United States Patent [19]

Morishita et al.

[11] Patent Number: 4,862,366

[45] Date of Patent: Aug. 29, 1989

[54] MOTOR-DRIVEN POWER STEERING SYSTEM FOR A VEHICLE

[75] Inventors: Mitsuharu Morishita; Shinichi Kohge, both of Himeji, Japan

[73] Assignee: Mitsubishi Denki Kabushiki Kaisha, Japan

[21] Appl. No.: 54,773

[22] Filed: May 27, 1987

[30] Foreign Application Priority Data

May 27, 1986 [JP] Japan ................................. 61-124009
Jul. 11, 1986 [JP] Japan ................................. 61-164161

[51] Int. Cl.$^4$ .............................................. B62D 5/04
[52] U.S. Cl. .............................. 364/424.05; 180/79.1; 180/142; 74/388 PS
[58] Field of Search ............... 364/424; 180/79.1, 142; 74/388 PS

[56] References Cited

U.S. PATENT DOCUMENTS

| | | | |
|---|---|---|---|
| 4,573,545 | 3/1986 | Kalns | 180/79.1 |
| 4,582,155 | 4/1986 | Ohe | 180/79.1 |
| 4,651,840 | 3/1987 | Shimizu et al. | 180/79.1 |
| 4,715,463 | 12/1987 | Shimizu | 180/79.1 |
| 4,730,686 | 3/1988 | Shimizu | 180/79.1 |
| 4,735,271 | 4/1988 | Shimizu | 180/79.1 |

Primary Examiner—Parshotam S. Lall
Assistant Examiner—Thomas G. Black
Attorney, Agent, or Firm—Leydig, Voit & Mayer

[57] ABSTRACT

A motor-driven power steering system for a vehicle capable of changing into a non-power assisted manual steering mode by means of a control unit when a speed sensor detects that the vehicle speed has exceeded a prescribed level. When the speed sensor has failed and/or wiring connecting the speed sensor to the control unit is broken, the control unit detects such sensor failure or wiring breaks and operates to change the steering system into a non-power assisted manual steering mode, thereby improving safety in high-speed driving of the vehicle.

8 Claims, 6 Drawing Sheets

MOTOR-DRIVEN POWER STEERING SYSTEM FOR A VEHICLE

BACKGROUND OF THE INVENTION

1. Field of the Invention

This invention relates to a motor-driven power steering system for a vehicle adapted to assist the operator-induced steering operation by means of the rotating force of a motor.

2. Description of the Prior Art

Figure 1:
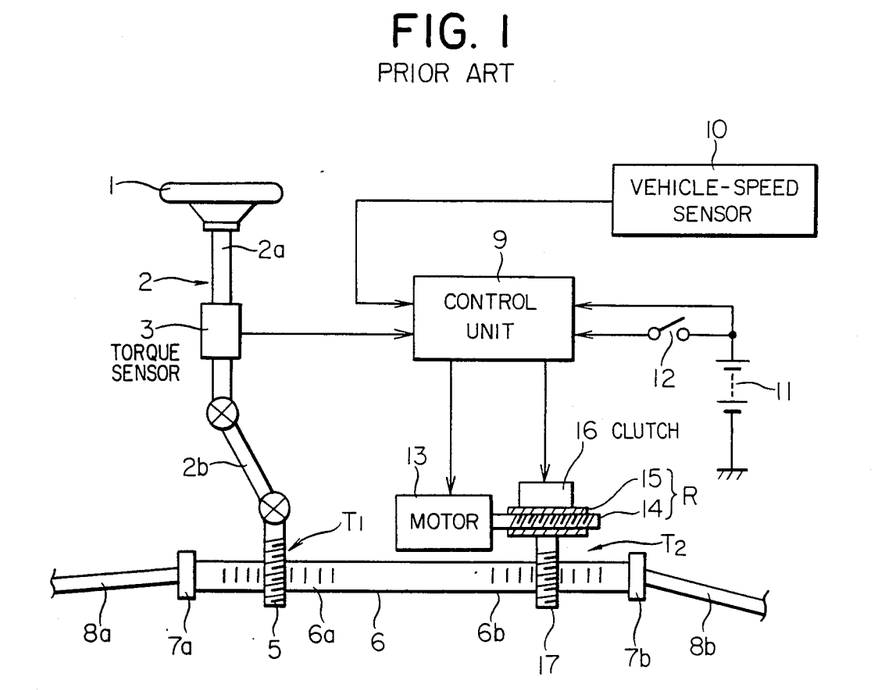
FIG. 1 is a schematic view illustrating the general arrangement of a motor-driven power steering system for a vehicle having a conventional control unit.

In the past, a conventional power steering system of this type, as schematically illustrated in FIG. 1, has hitherto been known in which a steering wheel 1 is operatively connected through a steering shaft 2 having an upper portion 2a and a lower portion 2b and a first rack and pinion gear $T_1$ including a first pinion 5 and a first rack tooth portion 6a with a steering rack 6 which is connected at its opposite ends with a pair of steerable road wheels (not shown) through a pair of tie rods 8a, 8b so that when the steering wheel 1 is turned by an operator, the steerable road wheels (not shown) are appropriately steered in accordance with the steering motion of the steering wheel 1 induced by the operator. On the other hand, the steering rack 6 is operatively connected with a motor 13 through a second rack and pinion gear $T_2$ including a second rack tooth portion 6b and a second pinion 17, a speed-reduction gear R, and a switching clutch 16 so that the driving force of the motor 13 is transmitted through the speed-reduction gear R, the switching clutch 16 and the second rack and pinion gear $T_2$ to the rack 6 so as to assist the steering operation of the steering wheel 1 induced by the operator. The motor 13 is electrically connected with a battery 11 through a control unit 9 and a key or ignition switch 12 so that it is energized by the battery 11 under the control of the control unit 9. The control unit 9 is input with control signals from a steering-torque sensor 3 and a vehicle-speed sensor 10 so as to appropriately control the operations of the motor 13 and the switching clutch 17 on the basis of the steering torque and the vehicle speed measured.

However, the power steering system as constructed above has the following problems. Specifically, when the travelling speed of the vehicle increases above or decreases below a prescribed level, the control unit 9 operates to deenergize or energize the switching clutch 16 to interrupt or enable the transmission of the assisting force from the motor 13 to the rack 6 so as to switch the steering system into a manual steering mode without any power assist or into a power steering mode with power assist. In this case, if the speed sensor 3 has failed or an electrical line or wiring connecting the speed sensor 3 to the control unit 9 is broken for some reason, no output signal is fed to the control unit 9 so that the motor 13 continues to operate with the clutch 16 connected. As a result, the steering system is continuously held in a power steering mode even when the vehicle speed exceeds the prescribed speed level. Such a situation is unfavorable from the standpoint of safety in driving of the vehicle.

SUMMARY OF THE INVENTION

In view of the above, the present invention is intended to obviate the above-described problem of the prior art, and has for its object the provision of a motor-driven power steering system for a vehicle which can ensure safety in high-speed driving of the vehicle even when the speed sensor has failed or the wiring connecting the speed sensor and the control unit is broken.

In order to achieve the above object, according to the present invention, there is provided a motor-driven power steering system for a vehicle having a steering wheel operatively connected to steer steerable road wheels in response to force exerted there by an operator, the motor-driven power steering system comprising:

a torque sensor connected to detect operator-induced steering torque resulting from steering force exerted on the steering wheel by the operator to generate an output signal representative thereof;

a vehicle speed sensor for detecting vehicle speed to generate an output signal representative thereof;

a motor connected to be energized by a source of electric power to transmit a force to the steerable road wheels for power assisting steering motion caused by the operator through the steering wheel;

a clutch means connected to be switched off for interrupting the transmission of the power-assisting force from the motor toward the steerable road wheels when the vehicle speed increases above a prescribed level, and switched on for establishing the transmission of the power-steering force when the vehicle speed decreases below the prescribed level; and a control unit connected through wirings to receive output signals from the torque sensor and the vehicle-speed sensor for controlling respective running and switch operations of the motor and the clutch means in such a manner that the power-assisting force transmitted from the motor to the steerable road wheels is controlled in accordance with the travelling speed of the vehicle and the steering torque exerted on the steering wheel by the operator under the normal operating condition of the vehicle speed sensor, but reduced to zero if the vehicle speed sensor has failed and/or the wiring connecting the vehicle speed sensor and the control unit is broken.

The current to be supplied to the motor is reduced to zero by the control unit in case of a failure in the vehicle speed sensor and/or breaks in the wiring connecting the vehicle speed sensor and the control unit. Also, the clutch means is switched off by the control unit in case of a failure in the vehicle speed sensor and/or breaks in the wiring connecting the vehicle speed sensor and the control unit.

In one embodiment, a vehicle height sensor is provided for detecting the height of the vehicle relative to road surfaces and generate an output signal representative thereof. In this case, the control unit comprises:

a steering torque measuring means connected to receive the output signal from the torque sensor for measuring the operator-induced steering torque;

a vehicle speed measuring means connected to receive the output signal from the vehicle-speed sensor for measuring the vehicle speed;

a vehicle height measuring means connected to receive the output signal from the vehicle height sensor and generate an output signal having a variation frequency and a variation amplitude which correspond to the measured vehicle height;

a vehicle travel judging means connected to receive the output signal of the vehicle height measuring means to determine rough-road conditions when the variation frequency and the variation amplitude of the output signal of the vehicle height measuring means are continuously greater than respective prescribed reference values for a time duration exceeding a prescribed period;

a speed-sensor failure determining means connected to receive output signals of the vehicle speed measuring means and the vehicle travel judging means and determine that there is failure in the vehicle speed sensor and/or breaks in the wiring connecting between the vehicle speed sensor and the control unit when the output of the vehicle speed measuring means is zero and when the vehicle travel judging means determines that the vehicle is travelling on a rough road;

a motor-current determining means connected to determine an appropriate current to be supplied to the motor in such a manner that the motor current is determined on the basis of the output signals of the steering torque measuring means and the vehicle speed measuring means in the normal operating condition of the vehicle speed sensor, but made zero when the speed-sensor failure determining means determines that there is failure in the vehicle speed sensor and/or breaks in the wiring connecting the vehicle speed sensor and the control unit;

a motor-current controlling means for controlling the running operation of the motor in accordance with the current determined by the motor-current determining means; and a clutch controlling means for controlling the switching operation of the clutch means in such a manner such that the clutch means is switched off when the measured vehicle speed is above the prescribed level or when the speed-sensor failure determining means determines that there is failure in the vehicle speed sensor and/or breaks in the wiring connecting between the vehicle speed sensor and the control unit, and switched on when the measured vehicle speed is below the prescribed level.

In another embodiment, a throttle opening sensor is provided for detecting the opening degree of a throttle valve disposed in an intake passage of the engine so as to generate an output signal representative of the detected throttle opening degree. In this case, the control unit comprises:

a steering torque measuring means connected to receive the output signal from the torque sensor for measuring the operator-induced steering torque;

a vehicle speed measuring means connected to receive the output signal from the vehicle speed sensor for measuring the vehicle speed;

a throttle opening measuring means connected to receive the output signal from the throttle opening sensor for measuring the opening degree of the throttle valve;

a speed-sensor failure determining means connected to receive the output signals of the vehicle speed measuring means and the throttle opening measuring means and determine that there is failure in the vehicle speed sensor and/or breaks in the wiring connecting between the vehicle speed sensor and the control unit when the opening degree of the throttle valve measured by the throttle opening measuring means is greater than a prescribed reference value and when zero output of the vehicle speed measuring means continues for a time duration exceeding a prescribed period;

a motor-current determining means connected to determine an appropriate current to be supplied to the motor in such a manner that the motor current is determined on the basis of the output signals of the steering torque measuring means and the vehicle speed measuring means in the normal operating condition of the vehicle speed sensor, but made zero when the speed-sensor failure determining means determines that there is failure in the vehicle speed sensor and/or breaks in the wiring connecting between the vehicle speed sensor and the control unit;

a motor-current controlling means for controlling the running operation of the motor in accordance with the current determined by the motor-current determining means; and a clutch controlling means for controlling the switching operation of the clutch means in such a manner that the clutch means is switched off when the measured vehicle speed is above the prescribed level or when the speed-sensor failure determining means determines that there is failure in the vehicle speed sensor and/or breaks in the wiring connecting the vehicle speed sensor and the control unit, and switched on when the measured vehicle speed is below the prescribed level.

The above and other objects, features and advantages of the present invention will become apparent from the following detailed description of a few presently preferred embodiments of the invention when taken in conjunction with the accompanying drawings.

BRIEF DESCRIPTION OF THE DRAWINGS

FIGS. 2 through 5 relate to a motor-driven power steering system in accordance with one embodiment of the present invention, in which:

FIGS. 6 and 7 relate to a motor-driven power steering system in accordance with another embodiment of the present invention, in which:

DESCRIPTION OF THE PREFERRED EMBODIMENTS

The present invention will now be described in detail with reference to a few preferred embodiments thereof as illustrated in the accompanying drawings. In the following, the same parts or elements of the embodiments will be identified by the same reference numerals and characters as employed in FIG. 1.

Figure 2:
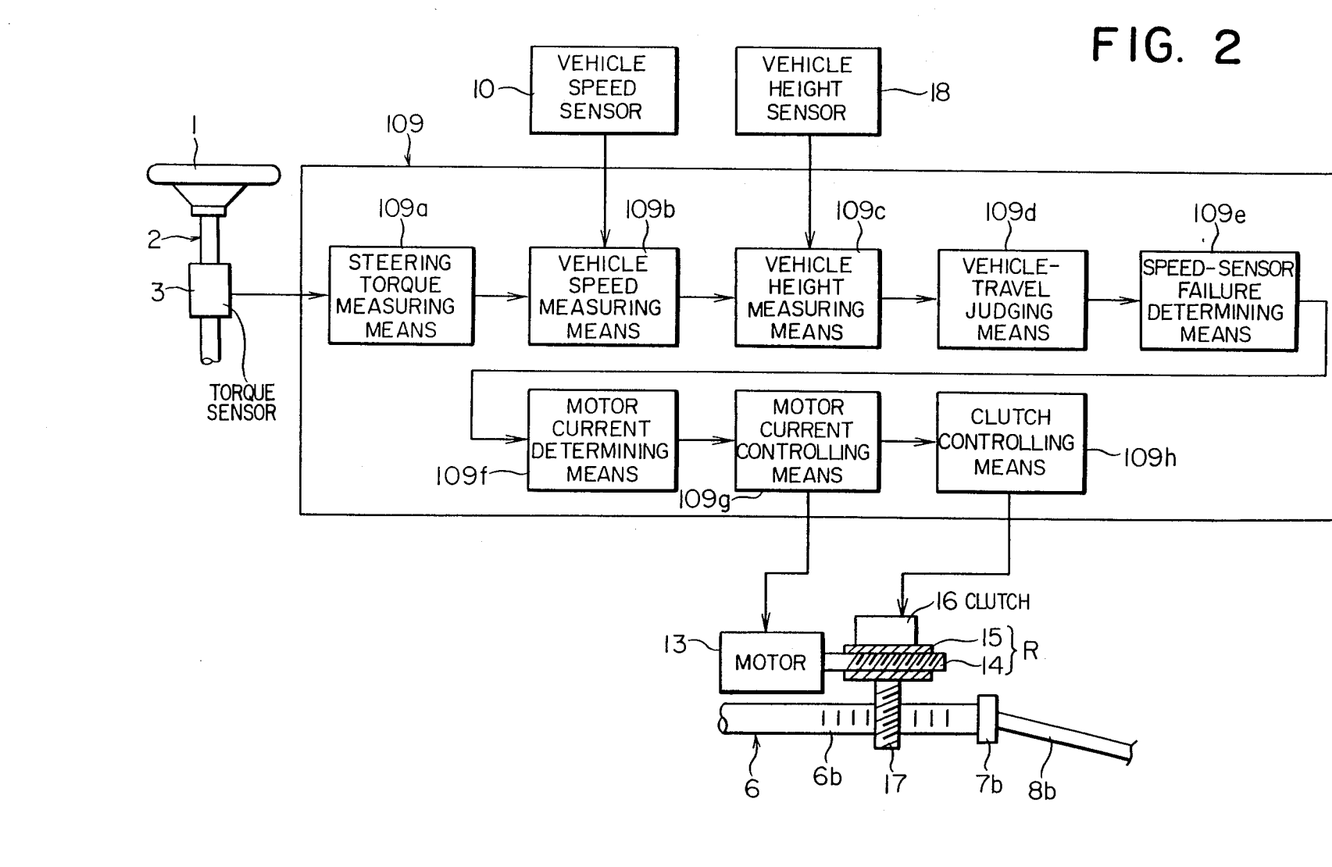
FIG. 2 is a block diagram showing a control unit and its related parts.

Referring to the drawings, and first to FIG. 2, there is shown a motor-driven power steering system having a control unit 109 constructed in accordance with one embodiment of the present invention. As diagrammatically illustrated in FIG. 2, the control unit 109 is adapted to receive the output signals from a torque sensor 3, a vehicle speed sensor 10 and a vehicle height sensor 18 for controlling the running operations of a motor 13 (in the form of a DC motor) and the switching operations of a clutch means 16) in the form of an electromagnetic switching clutch) in such a manner that the power-assisting force transmitted from the motor 13 to the steerable road wheels (not shown) is controlled in accordance with the travelling speed of the vehicle and the steering torque exerted on the steering wheel 1 by the operator under the normal operating condition of the vehicle speed sensor 10, but reduced to zero if the vehicle speed sensor 10 has failed and/or an electric line or wiring connecting the vehicle speed sensor 10 and the control unit 109 is cut or broken.

Specifically, as shown in FIG. 2, the control unit 109 comprises: a steering torque measuring means 109a connected to receive the output signal of the torque sensor 3 for measuring the operator-induced steering torque; a vehicle speed measuring means 109b connected to receive the output signal of the vehicle speed sensor 10 for measuring the travelling speed of the vehicle; a vehicle height measuring means 109c connected to receive the output signal from the vehicle height sensor 18 and generate an output signal having a variable frequency and a variable amplitude which correspond to the measured vehicle height; a vehicle travel judging means 109d connected to receive the output signal of the vehicle height measuring means 109c to determine rough-road conditions when the variable frequency and the variable amplitude of the output signal of the vehicle height measuring means 109c are greater than respective prescribed reference values for a time duration exceeding a preset period; a speed-sensor failure determining means 109e connected to receive the output signals of the vehicle speed measuring means 109b and the vehicle travel judging means 109d and determine that there is a failure in the vehicle speed sensor 10 and/or breaks in the wiring connecting the vehicle speed sensor 10 and the control unit 109 when the output of the vehicle speed measuring means 109b is zero and when the vehicle travel judging means 109d determines that the vehicle is travelling on a rough road; a motor-current determining means 109f connected to determine an appropriate current supplied to the motor 13 in such a manner that the motor current is determined on the basis of the output signals of the steering torque measuring means 109a and the vehicle speed measuring means 109b in the normal operating condition of the vehicle speed sensor 10, but made zero when the speed-sensor failure determining means 109e determines that there is a failure in the vehicle speed sensor 10 and/or breaks in the wiring connecting between the vehicle speed sensor 10 and the control unit 109; a motor-current controlling means 109g for controlling the running operation of the motor 13 in accordance with the current determined by the motor-current determining means 109f; and a clutch controlling means 109h for controlling the switching operation of the electromagnetic switching clutch 16 in such a manner that the clutch 16 is switched off when the measured vehicle speed is above a prescribed level or when the speed-sensor failure determining means 109e determines that there is failure in the vehicle speed sensor 10 and/or breaks in the wiring connecting between the vehicle speed sensor 10 and the control unit 109, and switched on when the measured vehicle speed is below the prescribed level.

Figure 3:
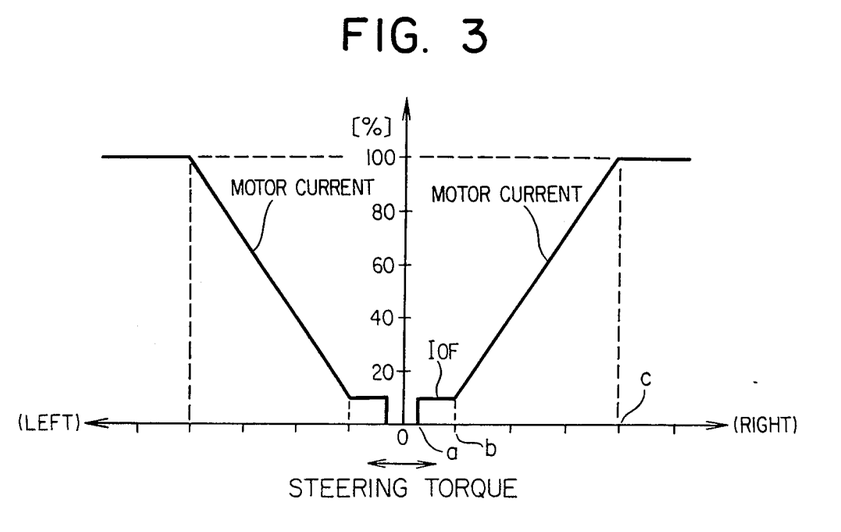
FIG. 3 is a graph showing a relationship between the motor current and the steering torque.
Figure 4:
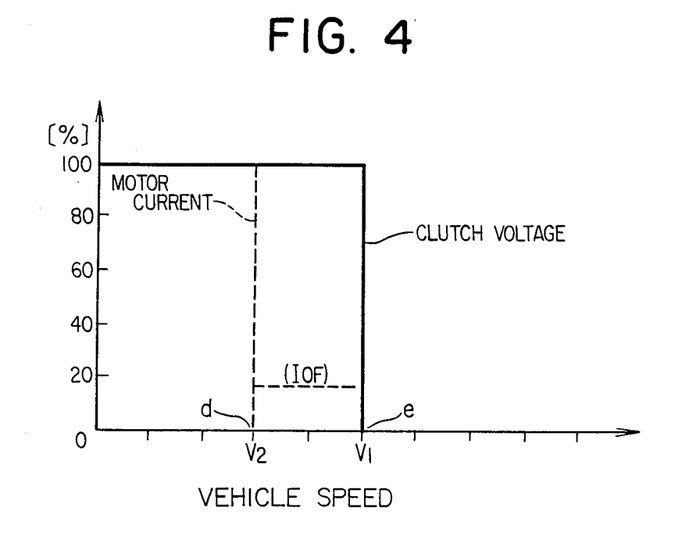
FIG. 4 is a graph showing a vehicle-speed/motor-current relationship and a vehicle-speed/clutch-voltage relationship.

Now, the operation of the control unit 109 will be described in detail with reference to FIGS. 3 through 5. First, the case in which a vehicle is stationary or standing still will be considered. In this case, when a key or ignition switch (not shown) is first turned on to start the engine, the electromagnetic switching clutch 16 is automatically actuated to place the second pinion 17 into mechanical coupling with the worm wheel 15. In this state, when the steering wheel 1 is turned by an operator, the control unit 109 acts to control the operation of the motor 13 in the manner as illustrated in FIG. 3. More specifically, when steering torque increases in the righthand direction to point a in FIG. 3, the motor 13 is turned on and supplied with an offset current of a certain low level $I_{OF}$ (for example, about 2 to 10 amperes) in order to alleviate the inertia influence from the motor 13 and the mechanical portions. As the steering torque further increases, the current supplied to the motor 13 begins to increase, at point b, linearly in direct proportion to the intensity of steering torque, and reaches 100% current at point c. On the other hand, as the steering torque decreases, current flowing through the motor 13 begins to decrease at point c and reaches the offset level $I_{OF}$ at point b. When the steering torque further decreases and reaches point a, the current supply to the motor 13 is reduced to zero and the motor 13 is stopped. Similar to this, the motor 13 is controlled in the same manner when the steering torque increases or decreases in the lefthand direction. In this connection, it is to be noted that the power-assisting torque generated by the motor 13 is in direct proportion to the current supplied thereto.

Accordingly, as pictured in FIG. 3, as the steering torque increases, the motor 13 is energized or turned on at point a and supplied with the offset current $I_{OF}$. As the steering torque further increases, the current supplied to the motor 13 begins to gradually increase at point b so that the output torque of the motor 13 to be transmitted to the worm 14 accordingly increases gradually. As a result, the assisting torque having the intensity corresponding to the operator's steering effort applied to the steering wheel 1 is transmitted to the second rack tooth portion 6b on the steering rack 6 through the intermediary of the worm wheel 15, the electromagnetic switching clutch 16 and the second pinion 17, thereby lightening the steering operation for the operator.

Now, the case in which the vehicle is travelling will be considered. In this case, as seen from FIG. 4, the control unit 109 controls the operations of the motor 13 and the electromagnetic switching clutch 16 in the following manner. The current supplied to the motor 13 is reduced to an offset current level $I_{OF}$ (about 2–10 amperes) at point d in FIG. 4 at which the vehicle speed increases to a prescribed second reference speed $V_2$, held constant at the offset current level $I_{OF}$ until the vehicle speed further increases to a prescribed first reference speed level $V_1$ at point e in FIG. 4, and reduced to zero at point e. Also, the voltage imposed on the clutch 16 is held constant at 100% level until the vehicle speed increases to the first reference speed level $V_1$ at point e, and made zero at the first reference speed level $V_1$ so that the clutch 16 is switched off to release the mechanical connection between the worm wheel 15 and the second pinion 17, thereby making the steering operation for the operator heavier, without any power assist.

With the prior art motor-driven power steering system as previously referred to, however, if there is a failure in the vehicle speed sensor 10 or breaks in the wiring connecting the speed sensor 10 and the control unit 109, it becomes impossible to control the power steering system in accordance with the travelling speed of the vehicle so that the steering system is continuously held in a power steering mode even when the vehicle travels at high speed. As a result, the steering operation for the operator becomes too light, thus reducing safety in driving at high speed.

In this case, however, according to the present invention, the power steering system is changed into a manual steering mode so as to avoid the above situation. To this end, according to this embodiment, failure in the vehicle speed sensor 10 and/or breaks in the wiring connecting the speed sensor 10 to the control unit 109 is first detected in the following manner. Namely, as illustrated in FIG. 2, the output signal of the vehicle height sensor 18 is input to the vehicle height measuring means 109c which outputs to the vehicle travel judging means 109d a vehicle height signal having a variable frequency $f_H$ and a variable amplitude $A_H$ which correspond to the measured vehicle height H. The vehicle travel judging means 109d determines from the vehicle height signal of the vehicle height measuring means 109c whether or not the vehicle is travelling on a rough road. If the variable frequency $f_H$ and the variable amplitude $A_H$ of the vehicle height signal continue to be greater than respective prescribed reference values (for example, 0.5 Hz and ±1 cm) for more than a prescribed time duration (for example, 5 seconds), it is determined that the vehicle is travelling on a rough road. In this state, if the vehicle speed V as measured by the vehicle speed measuring means 109b is zero, that is if the output signal of the vehicle speed measuring means 109b is zero, the speed-sensor failure determining means 109e determines that there is a failure in the speed sensor 18 and/or breaks in the wiring connecting the speed sensor 18 and the control unit 109. In that case, control unit 109 makes the current supplied to the motor 13 and the voltage imposed on the electromagnetic switching clutch 16 zero, thereby changing the steering system into a nonpower assisted manual steering mode.

Figure 5:
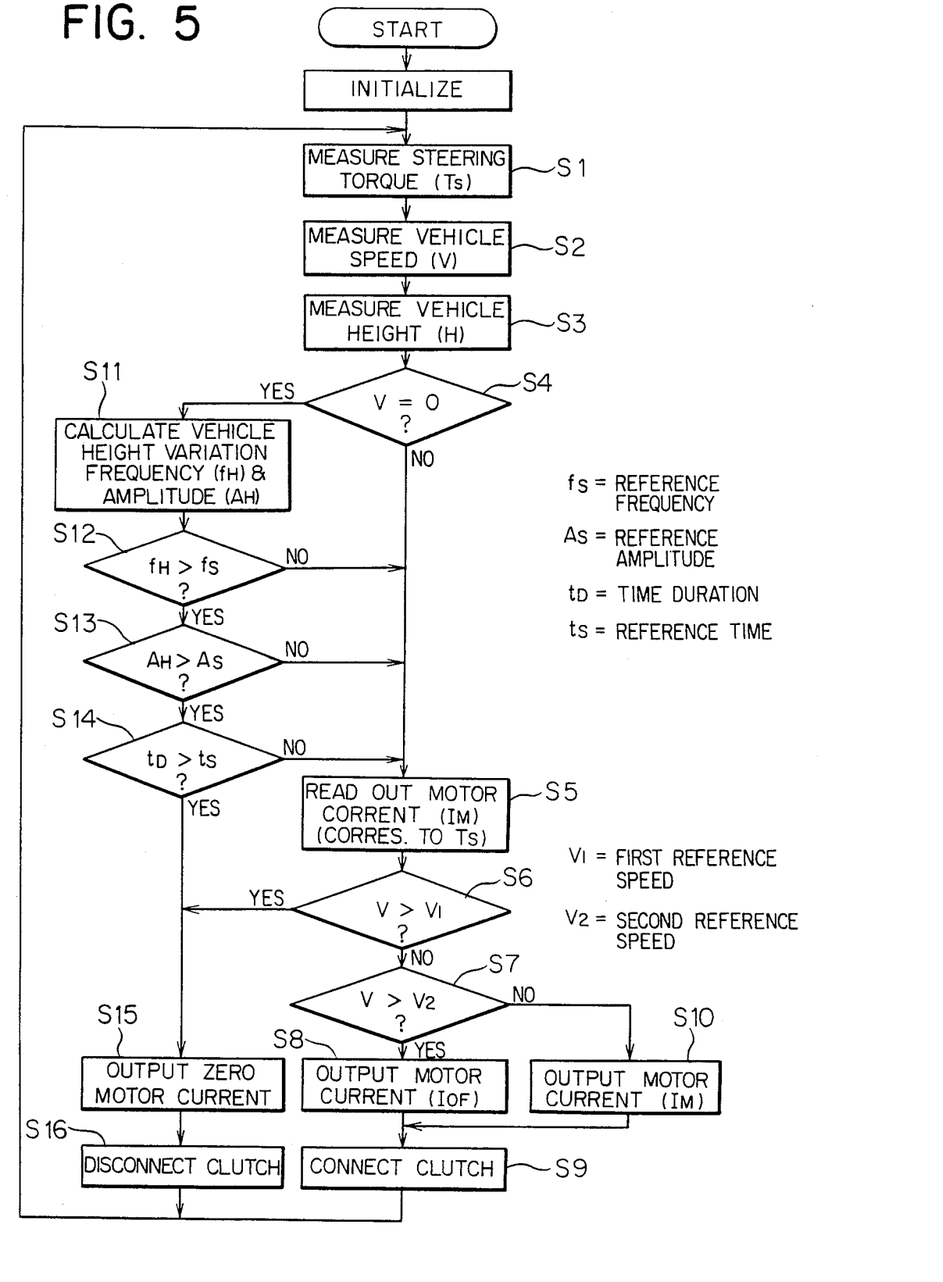
FIG. 5 is a flow chart showing the control process of the power steering system illustrated in FIG. 2.

More specifically, as illustrated in the flow chart of FIG. 5, the control unit 109 is initialized after the key or ignition switch is turned on, and then, at step S1, from the output signal of the steering torque sensor 3, the steering torque measuring means 109a measures the steering torque exerted on the steering wheel 1 by the operator. At step S2, from the output signal of the vehicle-speed sensor 10, the vehicle-speed measuring means 109b measures the travelling speed V of the vehicle and generates an output signal representative of the measured vehicle speed V, and at step S3, from the output signal of the vehicle height sensor 18, the vehicle height measuring means 109c measures the height H of the vehicle from the ground and generates a vehicle height signal having a variable frequency $f_H$ and a variable amplitude $A_S$ which correspond to the measured vehicle height. At step S4, it is determined that whether or not the measured vehicle speed V is equal to zero, and if not, the control process proceeds to step S5 where a motor current corresponding to the measured steering torque $T_S$ is read out. Then, at step S6, it is determined whether or not the vehicle speed V is greater than a first reference speed $V_1$, and if $V > V_1$, the control process proceeds to step S15, and if $V \leq V_1$, the control process proceeds to step S7 where it is further determined whether or not the vehicle speed V is greater than a second reference speed $V_2$ which is smaller than the first reference speed $V_1$. If $V > V_2$, the motor current is reduced to an offset current level $I_{OF}$ (for example 2-10 ampere), and the clutch 16 is connected at step S9. At step S7, however, if $V \leq V_2$, the control process proceeds to step S10 where the motor current $I_M$ corresponding to the measured steering torque $T_S$ is output, and then the control process proceeds to step S9.

On the other hand, at step S4, if it is judged that the vehicle speed is equal to zero, the control process proceeds to step S11 where the variable frequency $f_H$ and the variable amplitude $A_H$ of the vehicle height signal H are calculated. Then, at step S12, it is determined whether or not the calculated variable frequency $f_H$ of the vehicle height signal H is greater than a prescribed reference frequency $f_S$, and if not, the control process proceeds to step S5. If $f_H$ is greater than $f_S$ at step S13, it is determined whether or not the calculated variable amplitude $A_H$ of the vehicle height signal H is greater than a prescribed reference amplitude $A_S$. If not, the control process proceeds to step S5, but if so, at step S14 it is determined whether or not the time duration $t_D$ for which the condition of $f_H > f_S$ and $A_H > A_S$ continues is greater than a reference time $t_S$. If $t_D \leq t_S$, the control process proceeds to step S5, but if $t_D > t_S$, then the control process proceeds to step S15 where the current supplied to the motor 13 is made zero, and at step S16, the voltage imposed on the electromagnetic switching clutch 16 is also made zero thereby to disconnect the clutch 16. After steps S9 and S16, the control process returns to step S1, and the above-described operations are repeated.

Figure 6:
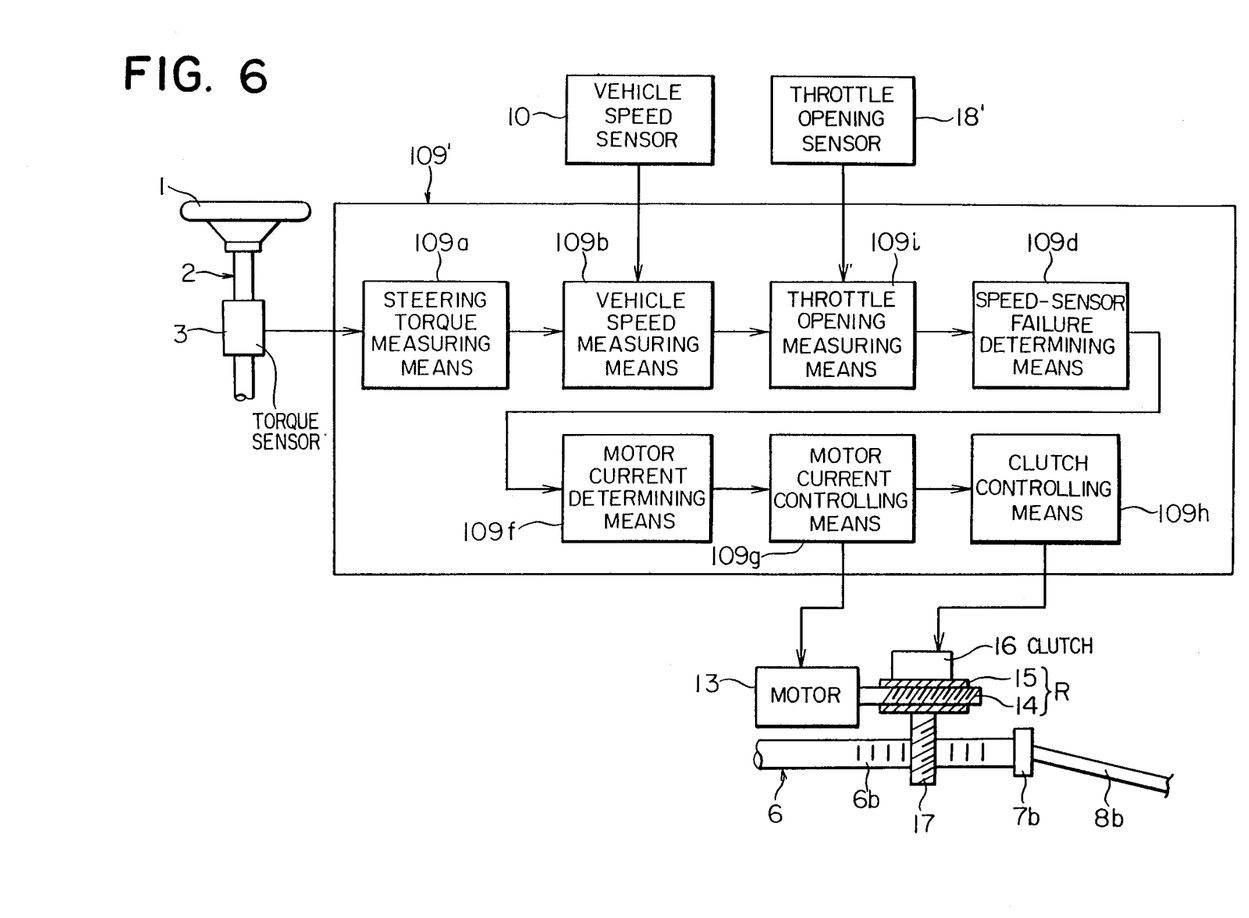
FIG. 6 is a block diagram showing a control unit and its related parts.

FIG. 6 shows another embodiment of the present invention which has a different control unit 109'. In this embodiment, in place of the vehicle height sensor 18 of the previous embodiment, there is provided a throttle opening sensor 18' for sensing the opening degree of an unillustrated throttle valve disposed in an unillustrated intake passage of an engine to generate an output signal representative of the detected throttle opening degree. The control unit 109' includes, in addition to the same components as those of the previous embodiment denoted by reference numerals 109a, 109b, and 109d through 109h, a throttle opening measuring means 109i in place of the vehicle height measuring means 109c and the vehicle travel judging means 109d. The throttle opening measuring means 109i is connected to receive the output signal from the throttle opening sensor 18' for measuring the opening degree $S_O$ of the throttle valve. The speed-sensor failure determining means 109e is connected to receive the output signals of the vehicle speed measuring means 109b and the throttle opening measuring means 109i and to determine whether or not there is a failure in the vehicle speed sensor 10 or breaks in the wiring connecting between the vehicle speed sensor 10 and the control unit 109'. In this regard, if the measured opening degree $S_O$ of the throttle valve is greater than a reference throttle opening $S_S$ (for example, 5-80% of the full throttle opening) and if zero output of the vehicle speed measuring means 109b continues for a time duration $t_D'$ greater than a reference time $t_S'$ (for example, 10-20 seconds), the speed-sensor failure determining means 109e determines that there is a failure in the speed sensor 10 and/or breaks in the wiring connecting between the speed sensor 10. In response the control unit 109' makes both the motor current and the clutch voltage zero, thereby changing the steering system into a non-power assisted manual steering mode.

Figure 7:
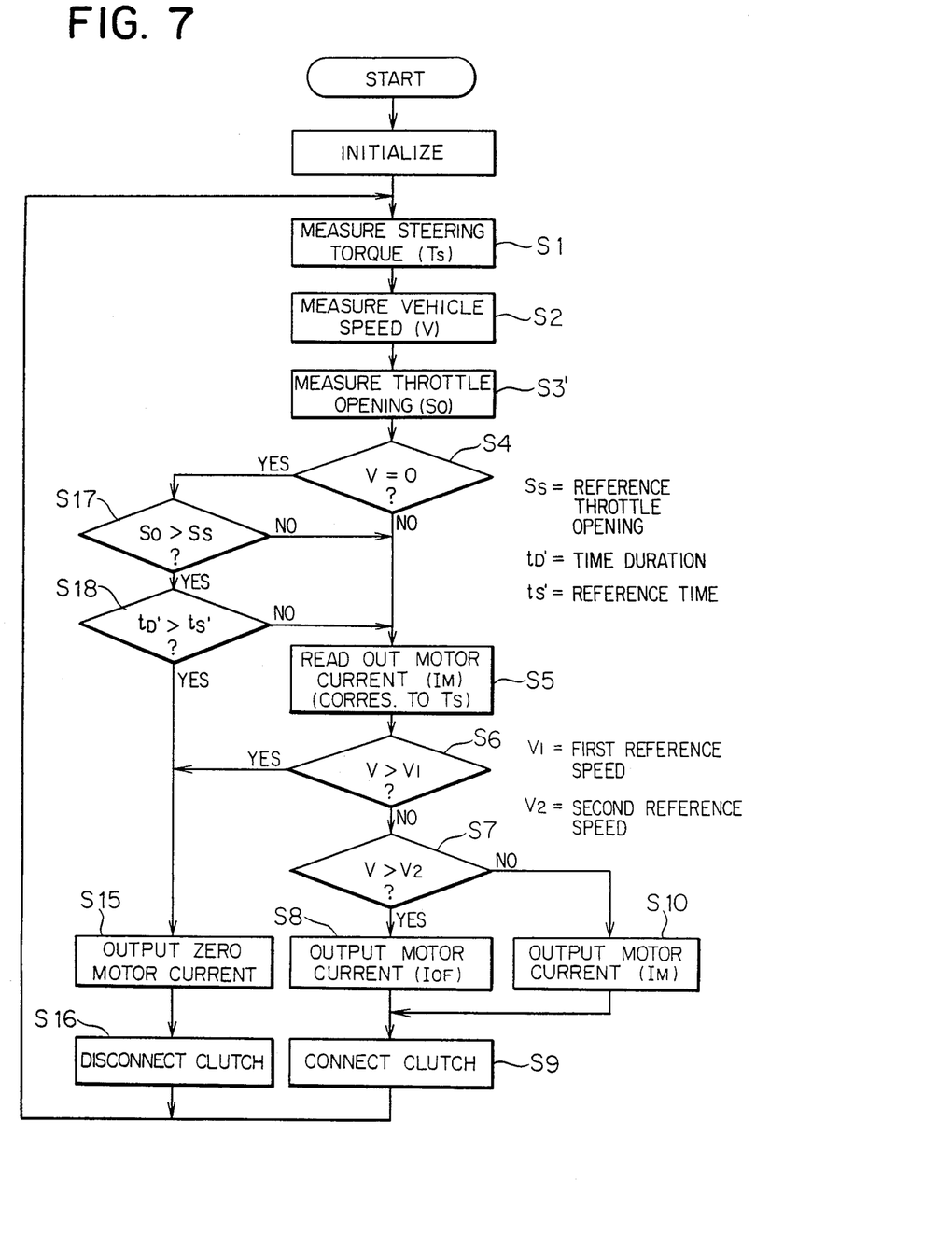
FIG. 7 is to a flow chart showing the control process of the power steering system illustrated in FIG. 6.

FIG. 7 is the flow chart showing the control process according to the embodiment of FIG. 6. This flow chart is substantially similar to the flow chart of FIG. 5 except for the following. Namely, in this flow chart, the step S3 of FIG. 5 is replaced by step S3', and the steps S11 through S14 of FIG. 5 are replaced by steps S17 and S18. At step S3', the throttle opening measuring means 109i measures from the output signal of the throttle opening sensor 18' the opening degree $S_O$ of an unillustrated throttle valve. At step S4, it is determined whether or not the measured vehicle speed V is equal to zero, and if not, the control process proceeds to step S5. On the other hand, if the vehicle speed V is zero, then the control process proceeds to step S17 where the measured opening degree $S_O$ of the throttle valve is compared with a reference throttle opening $S_S$. If $S_O \leq S_S$, the control process proceeds to step S5, but if $S_O > S_S$, then at step S18, the time duration $t_D'$ for which zero output of the vehicle speed measuring means 109b continues is compared with a reference time $t_S'$. If $t_D' \leq t_S'$, the control process proceeds to step S5, but if $t_D' > t_S'$, the control process proceeds to step S15. The control process of this flow chart other than the above is identical to that of FIG. 5 and hence further detailed description thereof is unnecessary.

What is claimed is:

1. A power steering system for a vehicle having a steering wheel for steering steerable road wheels in response to force exerted thereon by an operator comprising:
    means for sensing vehicle speed and for generating an output signal indicative of the sensed vehicle speed;
    a motor for applying a power-assisting force to said steerable road wheels for power-assisting the operator in steering said steerable road wheels;
    clutch means for interrupting the transmission of the power-assisting force from said motor to said steerable road wheels when the vehicle speed exceeds a prescribed speed, and for transmitting the power-assisting force from said motor to said steerable road wheels when the vehicle speed does not exceed the prescribed speed;
    means for indirectly determining vehicle motion and for generating a motion signal indicative of motion of said vehicle; and
    control means receiving said output signal and said motion signal for controlling said motor and clutch means in response to said output signal, for determining from said motion signal when said vehicle is in motion while said output signal indicates that the vehicle speed is zero, and for removing any power-assisting force from said steerable road wheels when said motion signal indicates said vehicle is in motion and said output signal indicates that the vehicle speed is zero whereby no power-assisting force is applied when said means for sensing vehicle speed has failed and/or the signal from the means for sensing vehicle speed is not received by said control means.

2. The power steering system of claim 1 including said control means for operating said clutch means to interrupt transmission of the power-assisting force to said steerable road wheels when said motion signal indicates said vehicle is in motion and said output signal indicates that the vehicle speed is zero whereby no power-assisting force is applied when said means for sensing vehicle speed has failed and/or the signal from the means for sensing vehicle speed is not received by said control means.

3. The power steering system of claim 1 including said control means for interrupting electrical current flow to said motor when said motion signal indicates said vehicle is in motion and said output signal indicates that the vehicle speed is zero whereby no power-assisting force is applied when said means for sensing vehicle speed has failed and/or the signal from the means for sensing vehicle speed is not received by said control means.

4. The power steering system of claim 1 including torque sensing means for detecting the steering torque exerted on said steering wheel by the operator to generate a torque signal indicative of the exerted steering torque and wherein said control means controls said motor in response to said torque signal to apply a power-assisting force to said steerable road wheels that varies in response to the exerted steering torque.

5. The power steering system of claim 1 wherein said means for indirectly determining vehicle motion includes means for sensing vehicle height and for generating a height signal having a variable amplitude and frequency indicative of the height of the vehicle relative to a road surface.

6. The power steering system of claim 5 wherein said means for sensing vehicle height indicates motion of said vehicle when the frequency and amplitude of said height signal exceed respective prescribed frequency and amplitude reference values for a time exceeding a prescribed period.

7. The power steering system of claim 1 wherein said vehicle is driven by an engine receiving fuel through a throttle valve having a variable degree of opening and wherein said means for indirectly determining vehicle motion includes means for sensing the degree of opening of said throttle valve and for generating a throttle signal indicative of the degree of opening of said throttle valve.

8. The power steering system of claim 7 wherein said means for sensing the degree of throttle opening indicates motion of said vehicle when the throttle signal exceeds a prescribed reference value and when the output signal indicates that the vehicle speed is zero for a time exceeding a prescribed period.

* * * * *